US009461799B2

(12) United States Patent
Futagi et al.

(10) Patent No.: US 9,461,799 B2
(45) Date of Patent: *Oct. 4, 2016

(54) BASE STATION AND METHOD FOR RECEIVING CONTROL INFORMATION

(71) Applicant: Sun Patent Trust, New York, NY (US)

(72) Inventors: Sadaki Futagi, Ishikawa (JP); Daichi Imamura, Beijing (CN); Seigo Nakao, Singapore (SG); Masayuki Hoshino, Kanagawa (JP); Akihiko Nishio, Osaka (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/828,247

(22) Filed: Aug. 17, 2015

(65) Prior Publication Data

US 2015/0358110 A1    Dec. 10, 2015

Related U.S. Application Data

(63) Continuation of application No. 14/091,164, filed on Nov. 26, 2013, now Pat. No. 9,143,301, which is a continuation of application No. 13/130,937, filed as application No. PCT/JP2009/006508 on Dec. 1, 2009, now Pat. No. 8,625,512.

(30) Foreign Application Priority Data

Dec. 2, 2008 (JP) .................... 2008-307658

(51) Int. Cl.
*H04L 1/00* (2006.01)
*H04W 72/04* (2009.01)
(Continued)

(52) U.S. Cl.
CPC ............ *H04L 5/0053* (2013.01); *H04L 1/001* (2013.01); *H04L 1/0004* (2013.01); *H04L 1/0015* (2013.01); *H04W 72/0413* (2013.01); *H04W 72/06* (2013.01); *H04W 72/082* (2013.01)

(58) Field of Classification Search
CPC ............ H04L 1/001; H04L 1/0004; H04W 72/0413; H04W 72/06; H04W 72/082
See application file for complete search history.

(56) References Cited

U.S. PATENT DOCUMENTS 8,165,081 B2 * 4/2012 Papasakellariou .... H04L 1/0026
370/329
8,265,053 B2   9/2012 Chen et al.
(Continued)

FOREIGN PATENT DOCUMENTS

EP   2 056 506 A1   5/2009
JP   2006-060383 A   3/2006
(Continued)

OTHER PUBLICATIONS

3rd Generation Partnership Project; Technical Specification Group Radio Access Network; Evolved Universal Terrestrial Radio Access (E-UTRA); Multiplexing and channel coding (Release 8), 3GPP TS 36.212 V8.4.0, Sep. 2008, 56 pages.
(Continued)

*Primary Examiner* — Donald Mills
*Assistant Examiner* — Henry Baron
(74) *Attorney, Agent, or Firm* — Seed IP Law Group PLLC

(57) ABSTRACT

Disclosed are an encoding ratio setting method and a radio communication device which can avoid encoding of control information at an encoding ratio lower than necessary and suppress lowering of the transmission efficiency of the control information. In the device, an encoding ratio setting unit (122) sets the encoding ratio $R'_{control}$ of the control information which is time-multiplexed with user data, according to the encoding ratio $R_{data}$ of the user data, $\Delta PUSCHoffset$ as the PUSCH offset of each control information, and $\Delta RANKoffset$ as the rank offset based on the rank value of the data channel using Expression (1).

$$R'_{control} = \frac{O}{Q'} = \max\left(\left\lceil \frac{O}{10^{\frac{-\Delta^{PUSCH}_{offset} + \Delta^{RANK}_{offset}}{10}} \cdot R_{data}} \right\rceil, \frac{O}{4 \cdot M_{sc}}\right) \quad (1)$$

Where $\lceil x \rceil$ is an integer not greater than x, and max(x,y) is the greater one among X and Y.

32 Claims, 7 Drawing Sheets

(51) Int. Cl.
  *H04W 72/06*  (2009.01)
  *H04W 72/08*  (2009.01)
  *H04L 5/00*   (2006.01)

(56) References Cited

U.S. PATENT DOCUMENTS

2006/0166626 A1   7/2006   Luo et al.
2009/0034637 A1   2/2009   Hoshino et al.
2011/0065443 A1   3/2011   Yellin et al.
2012/0220328 A1   8/2012   Yu et al.

FOREIGN PATENT DOCUMENTS

JP   2008-79262 A     4/2008
WO   2006/118081 A1   11/2006
WO   2006/130541 A2   12/2006

OTHER PUBLICATIONS

Hoshino et al., "A study on feedback related resource control scheme for downlink MIMO in Evolved UTRA," The Institute of Electronics Information and Communication Engineers:43-48, IEICE Technical Report, RCS2008-60 (2008-8), 2008, 7 pages.

InterDigital Communications, LLC, "Throughput evaluation UL Transmission Schemes for LTE-A," R1-083515, Agenda Item: 11, 3GPP TSG-RAN WG1 Meeting #54bis, Prague, Czech Republic, Sep. 29-Oct. 3, 2008, 8 pages.

International Search Report dated Dec. 17, 2009, 2 pages.

$3^{rd}$ Generation Partnership Project; Technical Specification Group Radio Access Network; Evolved Universal Terrestrial Radio Access (E-UTRA); Multiplexing and channel coding (Release 8), 3GPP TS 36.212 V8.3.0, May 2008, 53 pages.

Samsung, "Multiplexing Control and Data in the PUSCH," R1-081223, Agenda Item 6.1.4, 3GPP TSG RAN WG1 Meeting #52bis, Shenzhen, China, Mar. 31-Apr. 4, 2008, 5 pages.

* cited by examiner

|  | DATA CH RANK INDEX | ΔRANKoffset |
|---|---|---|
| CASE #1 | 1 | 0 |
| CASE #2 | 2 | a |
| CASE #3 | 3 | b |
| ⋮ | ⋮ | ⋮ |
| CASE #N | N | z |

FIG.3

| DATA CH RANK INDEX | ΔRANKoffset |
|---|---|
| 1 | 0 |
| 2 OR GREATER | a(a>0) |

FIG.4

|  | DATA CH RANK INDEX | CONTROL CH RANK INDEX | $\Delta RANK_{offset}$ |
| --- | --- | --- | --- |
| CASE #1 | 1 | 1 | 0 |
| CASE #2 | 1 | 2 | a(a<0) |
| CASE #3 | 2 | 1 | b(b>0) |
| CASE #4 | 2 | 2 | c |

FIG.7

|  | DATA CH RANK INDEX | CONTROL CH RANK INDEX | $\Delta RANK_{offset}$ |
| --- | --- | --- | --- |
| CASE #1 | 1 | 1 | 0 |
| CASE #2 | 1 | 2 | a(a<0) |
| CASE #3 | 2 | 1 | b(b>0) |
| CASE #4 | 2 | 2 | c |
| CASE #5 | 2 | 3 | d(d<0) |
| CASE #6 | 3 | 1 | e(e>0) |
| CASE #7 | 3 | 2 | f(f>0) |
| CASE #8 | 3 | 3 | g |
| CASE #9 | 3 | 4 | h(h<0) |
| CASE #10 | 4 | 1 | i(i>0) |
| CASE #11 | 4 | 2 | j(j>0) |
| CASE #12 | 4 | 3 | k(k>0) |
| CASE #13 | 4 | 4 | l |

FIG.8

|  | DATA CH RANK INDEX | CONTROL CH RANK INDEX | $\Delta \text{RANKoffset}$ |
|---|---|---|---|
| CASE #1 | 1 | 1 | 0 |
|  | 2 | 2 |  |
|  | 3 | 3 |  |
|  | 4 | 4 |  |
| CASE #2 | 2 | 1 | m |
|  | 4 | 2 |  |
| CASE #3 | 3 | 1 | n |
| CASE #4 | 3 | 2 | o |
| CASE #5 | 4 | 1 | p |
| CASE #6 | 4 | 3 | q |

FIG.9

BASE STATION AND METHOD FOR RECEIVING CONTROL INFORMATION

TECHNICAL FIELD

The present invention relates to a coding rate setting method and a radio communication apparatus used for a radio communication system using adaptive modulation and the multiple input multiple output (MIMO) technology.

BACKGROUND ART

For an uplink channel of 3rd generation partnership project radio access network long term evolution (3GPP RAN LTE, hereinafter referred to as "LTE"), single-carrier transmission is adapted to achieve a low peak to average power ratio (PAPR).

Further, for an LTE uplink channel, to achieve high throughput, adaptive modulation (AMC: adaptive modulation and coding) is used so as to select the modulation and coding scheme (MCS) pattern for each user depending on the channel quality indicator (CQI) of each user.

Further, introduction of the MIMO system is being considered to achieve higher transmission rate and to further improve the efficiency of use of frequency. Introduction of a rank transmission technique is also considered such as rank adaptation with which the rank indication (the number of rank) is adaptively switched depending on the status of a spatial propagation path to further improve transmission rate.

Under these circumstances, an agreement is made to time-multiplex control information and user data using the physical uplink shared channel (PUSCH) of the same subframe so as to maintain low PAPR even when both control information and user data are transmitted at the same time in an LTE uplink channel (see Non-Patent Literature 1).

The number of coded symbols, Q', of control information to be multiplexed with user data is set based on equation 1.

(Equation 1)

$$Q' = \min\left(\left\lceil \frac{O}{10^{\frac{-\Delta^{PUSCH}_{offset}}{10}} \cdot R_{data}} \right\rceil, 4 \cdot M_{sc}\right) = \min(Q1, Q2) \quad [1]$$

where $\lceil x \rceil$ is an integer not greater than x, and min(x,y) is the value of the smaller one of x and y.

In equation 1, $M_{sc}$ is the number of subcarriers per PUSCH subframe, and $\Delta PUSCHoffset$ is a PUSCH offset which varies per control information such as ACK/NACK, rank indicator (RI), or CQI. $\Delta PUSCHoffset$ is reported from a higher layer (see Non-Patent Literature 1).

O is the number of control information bits, and $R_{data}$ is represented by equation 2.

(Equation 2)

$$R_{data} = \frac{\sum_{r=0}^{C-1} K_r}{M_{sc} \cdot N_{symb}} \quad [2]$$

In equation 2, $K_r$ is the number of bits on r-th block, C is the number of blocks per PUSCH subframe, and $N_{symb}$ is the number of symbols per PUSCH subcarrier. The actual coding rate of user data is obtained by dividing $R_{data}$ in equation 2 by the number of bits per symbol, and is in proportion to $R_{data}$ in equation 2. Accordingly, $R_{data}$ in equation 2 will be hereinafter referred to as "user data coding rate."

In equation 1, Q1 is the number of coded symbols of control information that is set based on the number of control information bits O, user data coding rate $R_{data}$, and PUSCH offset $\Delta PUSCHoffset$, per control information. Q2 is the upper limit value of the number of coded symbols of control information. As shown in equation 1, the number of coded symbols of control information, Q', is set by the smaller one of the number of symbols Q1 and upper limit value Q2.

Here, equation 1 is modified to provide equation 3. As is the case with $R_{data}$ in equation 2, the actual coding rate of control information is obtained by dividing $R_{control}$ in equation 3 by the number of bits per symbol, and is in proportion to $R_{control}$ in equation 3. Accordingly, $R_{control}$ in equation 3 will be hereinafter referred to as "control information coding rate (coding rate of control information)."

(Equation 3)

$$R_{control} = \frac{O}{Q'} = \max\left(\frac{O}{\left\lceil 10^{\frac{-\Delta^{PUSCH}_{offset}}{10}} \cdot R_{data} \right\rceil}, \frac{O}{4 \cdot M_{sc}}\right) = \max(R1, R2) \quad [3]$$

where $\lceil x \rceil$ is an integer not greater than x, and max(x,y) is the value of the greater one of x and y. In equation 3, R1 is the coding rate that is set based on user data coding rate $R_{data}$ and PUSCH offset, $\Delta PUSCHoffset$, per control information. R2 is the lower limit value of control information coding rate $R_{control}$. As is shown in equation 3, control information coding rate $R_{control}$ is set to the value of the greater value of coding rate R1 and lower limit value R2. A case will be described below where coding rate R1 is greater than lower limit value R2, and control information coding rate $R_{control}$ is set as coding rate R1.

In this case, in equation 3, when PUSCH offset $\Delta PUSCHoffset$ is greater than 0, control information coding rate $R_{control}$ is set lower than user data coding rate $R_{data}$. Generally, unlike user data, control information is not retransmitted. Therefore, by setting PUSCH offset $\Delta PUSCHoffset$ to be greater than 0 and using equation 3, it is possible to lower control information coding rate $R_{control}$ than user data coding rate $R_{data}$ to enhance the capability of error correction of control information.

CITATION LIST

Non-Patent Literature

NPL1
3GPP TS 36.212 v8.4.0, "Uplink transport channels and control information"

SUMMARY OF INVENTION

Technical Problem

However, when control information coding rate $R_{control}$ is set simply by using only user data coding rate $R_{data}$ and PUSCH offset $\Delta PUSCHoffset$, per control information, there is a possibility that adaptive modulation is applied depending on a channel quality indicator of user, and efficiency of control information transmission is decreased when rank indication of a data channel (hereinafter referred to as "data CH") in which user data is transmitted, is transmitted.

For example, when rank 2 is applied to a data CH and reception quality is deteriorated due to interference between streams (inter-stream interference), in adaptive modulation, user data MCS is lowered and user data coding rate $R_{data}$ is set lower to prevent the decrease in the efficiency of transmission due to deteriorated reception quality.

In such a case where user data MCS is lowered by adaptive modulation, if control information coding rate $R_{control}$ is set based on equation 3, control information coding rate $R_{control}$ may be set excessively low. As a result of this, for example, even when the rank indication of a control channel (hereinafter referred to as "control CH"), in which control information is transmitted, is not transmitted, and the control CH is not subject to the influence of interference between streams, control information is encoded at a lower coding rate to have excessively high quality, therefore lowering the efficiency of control information transmission.

In view of the above, it is therefore an object of the present invention to provide a coding rate setting method and a radio communication apparatus that can prevent control information from being encoded at an excessively low coding rate and can suppress the decrease in the efficiency of control information transmission.

Solution to Problem

A coding rate setting method according to the present invention sets a user data coding rate to be adaptively set according to a channel quality indicator of a user as a reference value, corrects the reference value based on a type of control information to be time-multiplexed with the user data and a rank indication of a data channel in which the user data is transmitted, and
sets the corrected reference value as a control information coding rate.

A radio communication apparatus according to the present invention comprises a coding rate obtaining section that sets a user data coding rate to be adaptively set according to a channel quality indicator of a user as a reference value, obtains the reference value corrected based on a type of control information to be time-multiplexed with the user data and a rank indication of a data channel in which the user data is transmitted, as a the control information coding rate, and an encoding section that encodes the control information based on the control information coding rate.

Advantageous Effects of Invention

According to the present invention, it is possible to prevent control information from being encoded at an excessively low coding rate, and suppress the decrease in the efficiency of control information transmission.

BRIEF DESCRIPTION OF DRAWINGS

FIG. 3 shows an example of a rank information offset table according to Embodiment 1 of the present invention;

FIG. 4 shows another example of a rank information offset table according to Embodiment 1 of the present invention;

FIG. 7 shows an example of a rank information offset table according to Embodiment 2 of the present invention;

FIG. 8 shows another example of a rank information offset table according to Embodiment 2 of the present invention; and FIG. 9 shows yet another example of a rank information offset table according to Embodiment 2 of the present invention.

DESCRIPTION OF EMBODIMENTS

Now, embodiments of the present invention will be described in detail with reference to the accompanying drawings.

Embodiment 1

A case will be described here with the present embodiment where a control information coding rate is set by a offset corresponding to a rank indication of a data CH in which user data is transmitted, when adaptive modulation is applied according to a channel quality indicator of a user. Control information may include ACK/NACK, RI, and CQI, for example, and is time-multiplexed with user data to be transmitted from a terminal apparatus (hereinafter referred to as "terminal") to a base station apparatus (hereinafter referred to as "base station").

The control information coding rate can be set either at a base station or at a terminal. A case will be described below where the control information coding rate is set at a terminal.

Figure 1:
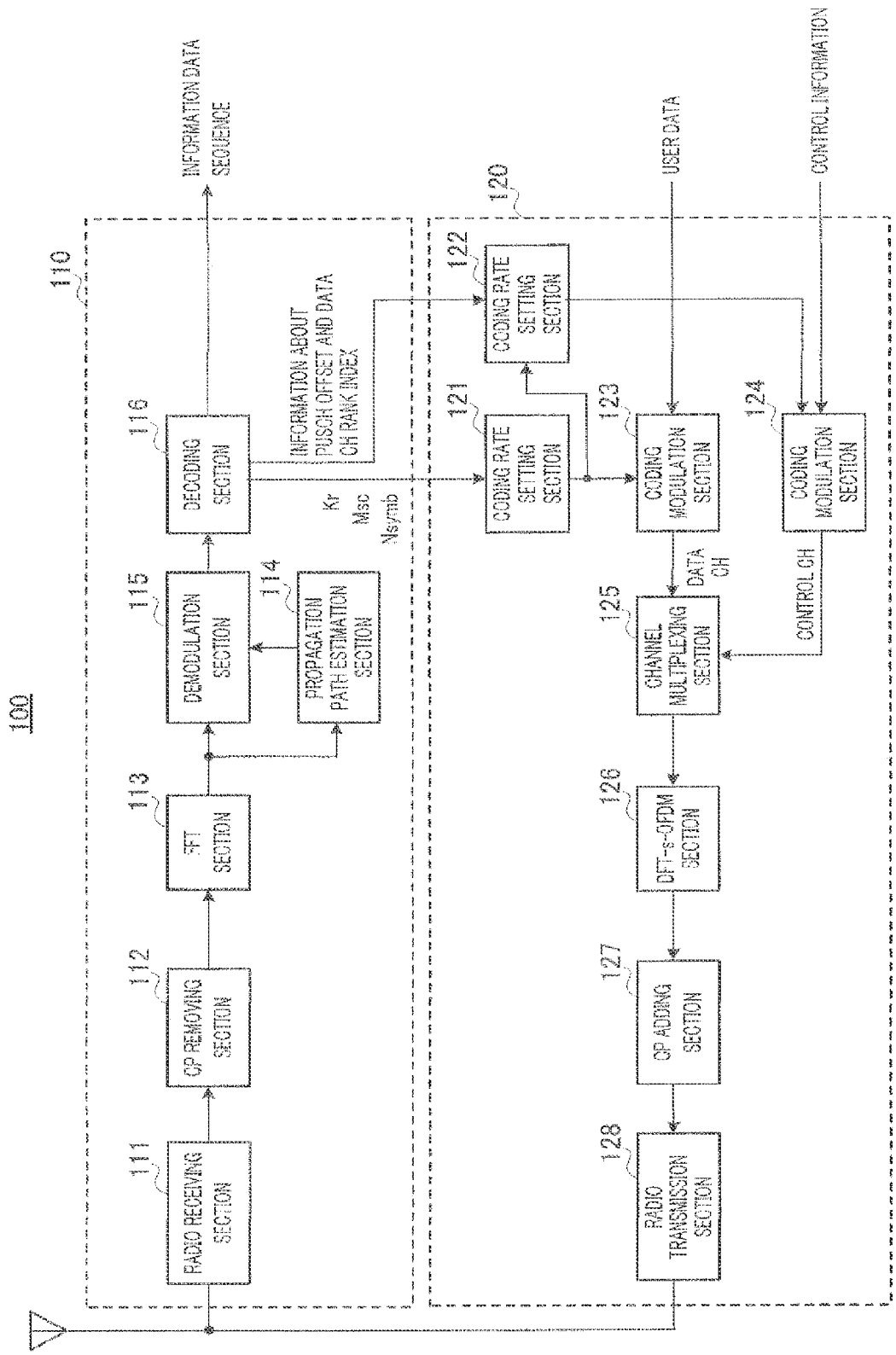
FIG. 1 is a block diagram showing a main configuration of a terminal according to Embodiment 1 of the present invention.

FIG. 1 is a block diagram showing a main configuration of a terminal according to the present embodiment. In FIG. 1, receiving section 110 of terminal 100 comprises radio receiving section 111, cyclic prefix (CP) removing section 112, fast Fourier transform (FFT) section 113, propagation path estimation section 114, demodulation section 115, and decoding section 116. Further, in FIG. 1, transmission section 120 of terminal 100 comprises coding rate setting section 121, coding rate setting section 122, coding modulation section 123, coding modulation section 124, channel multiplexing section 125, discrete Fourier transform-spread-OFDM (DFT-s-OFDM) section 126, CP adding section 127, and radio transmission section 128.

Radio receiving section 111 converts a received signal received via an antenna to a baseband signal, and outputs the baseband signal to CP removing section 112.

CP removing section 112 removes a cyclic prefix (CP) from the baseband signal output from radio receiving section 111 and outputs, as a time domain signal, the baseband signal without a CP to FFT section 113.

FFT section 113 obtains a frequency domain signal by performing a fast Fourier transform on the time domain signal output from CP removing section 112, and outputs the obtained frequency domain signal to propagation path estimation section 114 and demodulation section 115.

Propagation path estimation section 114 estimates the propagation path environment of the received signal by using a pilot signal contained in the frequency domain signal output from FFT section 113, and outputs the estimation result, which is the estimated propagation path environment of the received signal, to demodulation section 115.

Demodulation section 115 applies a propagation path compensation with respect to the frequency domain signal which is output from FFT section 113, and from which the pilot signal is removed, based on the estimation result output from propagation path estimation section 114. Further, demodulation section 115 demodulates the frequency domain signal after propagation path compensation based on the same MCS as used at the base station, i.e. the same modulation scheme and coding rate, etc. to obtain a demodulated signal, and outputs the obtained demodulated signal to decoding section 116.

Decoding section 116 corrects errors with respect to the demodulated signal output from demodulation section 115, to obtain a decoded signal. Then, decoding section 116 extracts, from the obtained decoded signal, information such as an information data sequence, the number of bits per block $K_r$, the number of subcarriers per subframe $M_{sc}$, the number of symbols per subcarrier $N_{symb}$, a PUSCH offset, and a data CH rank indication (the number of a rank for a data CH). Information about $M_{sc}$ and $N_{symb}$ are set at favorable values at a base station by being adaptively modulated according to the CQI transmitted from terminal 100. Decoding section 116 outputs the extracted information on $K_r$, $M_{sc}$ and $N_{symb}$ to coding rate setting section 121, and outputs the extracted information on the PUSCH offset and the data CH rank indication to coding rate setting section 122.

Coding rate setting section 121 sets user data coding rate $R_{data}$ based on information on $K_r$, $M_{sc}$, and $N_{symb}$ input from decoding section 116, based on equation 2. Coding rate setting section 121 outputs the set user data coding rate $R_{data}$ to coding rate setting section 122 and coding modulation section 123.

Coding rate setting section 122 sets control information coding rate $R'_{control}$ based on information on user data coding rate $R_{data}$, the PUSCH offset, and the data CH rank indication. The internal configuration of coding rate setting section 122 and the method of setting control information coding rate $R'_{control}$ will be described later. Coding rate setting section 122 outputs the set control information coding rate $R'_{control}$ to coding modulation section 124.

Coding modulation section 123 generates encoded data by encoding the input user data based on information on user data coding rate $R_{data}$ output from coding rate setting section 121, and generates data CH transmission data by modulating the generated encoded data. Coding modulation section 123 outputs the generated data CH transmission data to channel multiplexing section 125.

Coding modulation section 124 generates encoded data by encoding control information based on coding rate $R'_{control}$ output from coding rate setting section 122, and generates control CH transmission data by modulating the generated encoded data. Coding modulation section 124 outputs the generated control CH transmission data to channel multiplexing section 125.

Channel multiplexing section 125 time-multiplexes the data CH transmission data output from coding modulation section 123 and the control CH transmission data output from coding modulation section 124, to generate multiplexed transmission data. Channel multiplexing section 125 outputs the multiplexed transmission data to DFT-s-OFDM section 126.

DFT-s-OFDM section 126 obtains a frequency domain signal by performing a discrete Fourier transform (DFT) on the multiplexed transmission data output from channel multiplexing section 125. DFT-s-OFDM section 126 maps the frequency domain signal on a transmission subcarrier, performs an inverse fast Fourier transform (IFFT) on the mapped frequency domain signal to obtain a transmission data sequence, and outputs the obtained transmission data sequence to CP adding section 127.

CP adding section 127 adds a CP to the transmission data sequence output from DFT-s-OFDM section 126 by duplicating the data in the end of a frame and inserting the duplicated data in the head of the frame, in each frame of the transmission data sequence, and outputs the transmission data sequence with a CP as the baseband signal, to radio transmission section 128.

Radio transmission section 128 converts the frequency with respect to the baseband signal output from CP adding section 127 into radio frequency bandwidth to obtain a transmission signal, and transmits the obtained transmission signal via an antenna.

Figure 2:
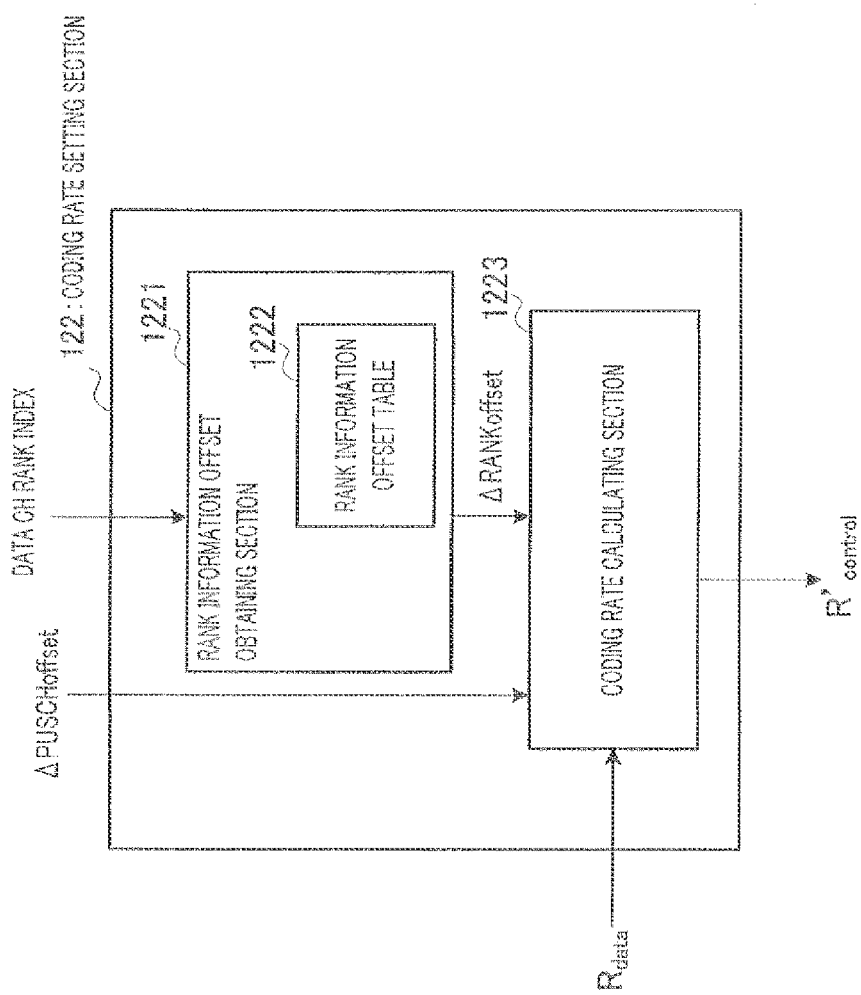
FIG. 2 is a block diagram showing a main configuration of a coding rate setting section according to Embodiment 1 of the present invention.

FIG. 2 is a block diagram showing an internal configuration of coding rate setting section 122 according to the present embodiment.

Rank information offset obtaining section 1221 stores rank information offset table 1222 inside, and obtains rank offset $\Delta RANK_{offset}$ from rank information table 1222 corresponding to the data CH rank indication. Rank information offset table 1222 will be explained later. Rank information offset obtaining section 1221 outputs the obtained rank offset $\Delta RANK_{offset}$ to coding rate calculating section 1223.

Coding rate calculating section 1223 sets control information coding rate $R'_{control}$ based on user data coding rate $R_{data}$, PUSCH offset $\Delta PUSCH_{offset}$ and rank offset $\Delta RANK_{offset}$, corresponding to the data CH rank indication, based on equation 4.

(Equation 4)

$$R'_{control} = \frac{O}{Q'} = \max\left(\left\lceil \frac{O}{10^{\frac{-\Delta PUSCH_{offset}+\Delta RANK_{offset}}{10}} \cdot R_{data}} \right\rceil, \frac{O}{4 \cdot M_{sc}}\right) = \max(R'1, R'2) \quad [4]$$

where $\lceil x \rceil$ is an integer not greater than x, and max(x,y) is the value of the greater one of x and y.

In equation 4, R'1 is a coding rate that is set based on user data coding rate $R_{data}$, PUSCH offset per control information which is defined as $\Delta PUSCH_{offset}$, and rank offset corresponding to the data CH rank indication which is defined as $\Delta RANK_{offset}$. R2' is the lower limit value of control information coding rate $R'_{control}$. A case will be described below where coding rate R'1 is greater than lower limit value R'2, and control information coding rate $R_{control}$ is set as coding rate R'1.

Further, in equation 4, O is the number of control information bits and Q' is the number of coded symbols of control information. The number of coded symbols of control information Q' is represented by equation 5.

(Equation 5)

$$Q' = \min\left(\left\lceil \frac{O}{10^{\frac{-\Delta_{offset}^{PUSCH} + \Delta_{offset}^{RANK}}{10}} \cdot R_{data}} \right\rceil, 4 \cdot M_{sc}\right) \quad [5]$$

where ⌈x⌉ is an integer not greater than x, and min(x,y) is the value of the smaller one of x and y. As is obvious in equation 4, according to the present embodiment, by correcting user data coding rate $R_{data}$ using PUSCH offset ΔPUSCHoffset, corresponding to a type of control information and rank offset ΔRANKoffset, corresponding to a data CH rank indication, it is possible to set the corrected user data coding rate as control information coding rate $R'_{control}$. In other words, by setting the user data coding rate $R_{data}$, to be adaptively set according to the user CQI, as a reference value, and by correcting the reference value based on PUSCH offset ΔPUSCHoffset, corresponding to the type of control information, and rank offset ΔRANKoffset, corresponding to the data CH rank indication, it is possible to set the corrected reference value as control information coding rate $R'_{control}$.

As PUSCH offset ΔPUSCHoffset corresponding to the type of control information, ΔHARQ-ACK is used when control information is HARQ-ACK, ΔRI is used when control information is RI, and ΔCQI is used when control information is CQI, for example. An offset corresponding to the type of control information such as ΔHARQ-ACK, ΔRI, and ΔCQI is reported from a base station via a higher layer (see Non-Patent Literature 1).

FIG. 3 shows an example of rank information offset table 1222 stored inside the rank information offset obtaining section 1221. According to the present embodiment, rank information offset table 1222 stores rank offset, ΔRANKoffset, of a greater value for a data CH rank indication of a greater value. For example, in rank information offset table 1222 in FIG. 3, rank offsets ΔRANKoffset, are set at from a to z in ascending order of data CH rank indications, and ΔRANKoffset values of from a to z are set to satisfy z> . . . >b>a.

As described above, by setting rank offset ΔRANKoffset of a greater value for the data CH rank indication of a greater value, it is possible to correct control information coding rate $R'_{control}$, to be obtained based on equation 4, to become higher when the data CH rank indication is greater.

Generally, the influence of interference between streams becomes greater when a rank indication is greater. Therefore, when a data CH rank indication is large, in adaptive modulation, user data MCS is lowered to ensure reception quality. That is, in adaptive modulation, user data coding rate $R_{data}$ is set lower, when a data CH rank indication is greater and the influence of interference between streams is greater.

Therefore, in the case where user data coding rate $R_{data}$ is set lower in adaptive modulation, when the control information coding rate is set using only PUSCH offset, ΔPUSCHoffset, per control information, based on equation 3, for example, the control information coding rate is set further lower than user data coding rate $R_{data}$. Accordingly, there is a possibility that control information is encoded at an excessively low coding rate.

In contrast, according to the present embodiment, the control information coding rate is set by equation 4 using rank offset, ΔRANKoffset, of a greater value for a data CH rank indication of a greater value, in addition to an offset per control information. By this means, the control information coding rate is corrected higher when the data CH rank indication is greater, and it is possible to prevent the control information coding rate from being set excessively low. In this way, according to the present embodiment, it is possible to obtain the control information coding rate by correcting the user data coding rate, based on the difference of the influence of interference between streams that a data CH suffers and the influence of interference between streams that a control CH suffers.

As described above, according to the present embodiment, coding rate setting section 122 corrects the value of the user data coding rate to be adaptively set according to a channel quality indicator of a user, based on the type of control information to be time-multiplexed with user data and the rank indication of a data CH in which user data is transmitted, and sets the corrected value of the coding rate as the control information coding rate. That is, coding rate setting section 122 sets the user data coding rate to be adaptively set according to a channel quality indicator of a user, as a reference value, corrects the reference value based on the type of control information to be time-multiplexed with user data and the rank indication of a data CH in which user data is transmitted, and sets the corrected reference value as the control information coding rate. For example, coding rate setting section 122 sets control information coding rate $R'_{control}$ to be time-multiplexed with user data, based on user data coding rate $R_{data}$, PUSCH offset ΔPUSCHoffset, per control information, and rank offset ΔRANKoffset, corresponding to a data CH rank indication, based on equation 4.

In this way, according to the present embodiment, the value of the user data coding rate is corrected based on the type of control information and the data CH rank indication, and the corrected value of the coding rate is set as the control information coding rate. By this means, even when the rank indication of a data CH in which user data is transmitted is greater and the user data coding rate is set lower in adaptive modulation, it is possible to prevent the control information coding rate from being set excessively low and suppress the decrease in the efficiency of control information transmission.

Further, by correcting the control information coding rate to become higher when a data CH rank indication is greater, it is possible to correct the value of the user data coding rate, based on the difference of the influence of interference between streams that the data CH suffers and the influence of interference between streams that a control CH suffers, so as to set the user data coding rate as the control information coding rate. As a result of this, even when the user data coding rate is extremely low, it is possible to prevent the control information coding rate from being set excessively low and suppress the decrease in the efficiency of control information transmission.

A case has been described with the above embodiment as an example where rank information offset obtaining section 1221 stores rank information offset table 1222, in which the rank offset is defined separately for each rank indication, for example, from a to z. Rank information offset obtaining section 1221, however, may not store rank information offset table 1222, and may calculate rank offset ΔRANKoffset based on the equation shown as equation 6.

(Equation 6)

ΔRANKoffset=(rank indication−1)×a (a is a constant)     [6]

Further, it is not necessary to define the rank offset at a different value for each rank indication, and it is possible to define the same rank offset for a plurality of rank indications. For example, it is possible to divide data channel rank indications into a plurality of groups by comparing the data channel rank indications with a predetermined threshold value, and define a rank offset so that the control information coding rate is set higher when a data CH rank indication in each group is greater. As shown in FIG. 4, for example, it is possible to define all rank offsets at a(a>0) for the rank indication of 2 or greater.

Embodiment 2

A case has been described with Embodiment 1 where, when a data CH rank indication is transmitted, the control information coding rate is set based on a rank offset corresponding to the data CH rank indication. A case will be described here with the present embodiment where, when a data CH rank indication and a control CH rank indication (the number of a rank for a control CH) are transmitted, the control information coding rate is set based on the rank offset based on the combination of the data CH rank indication and the control CH rank indication.

Figure 5:
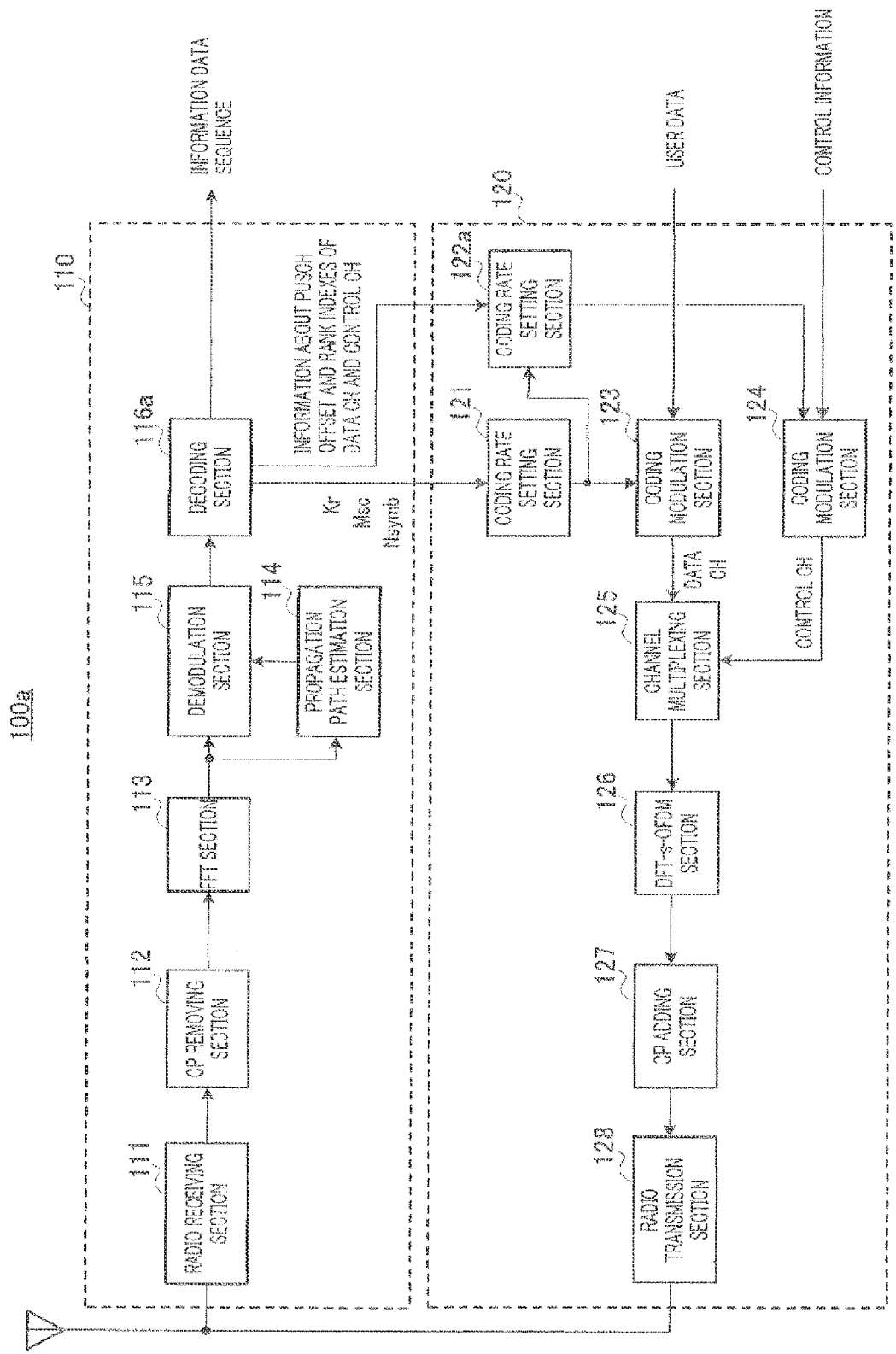
FIG. 5 is a block diagram showing a main configuration of a terminal according to Embodiment 2 of the present invention.

FIG. 5 is a block diagram showing a main configuration of a terminal according to the present embodiment. In a terminal according to the present embodiment in FIG. 5, parts that are the same as in FIG. 1 will be assigned the same reference numerals as in FIG. 1 and overlapping explanations will be omitted. In FIG. 5, terminal 100a is provided with decoding section 116a and coding rate setting section 122a instead of decoding section 116 and coding rate setting section 122 in terminal 100 in FIG. 1.

As is the case with Embodiment 1, the control information coding rate can be set either at a base station or at a terminal. A case will be described below where the control information coding rate is set at a terminal.

Decoding section 116a obtains a decoded signal by correcting errors with respect to a demodulated signal output from demodulation section 115. Then, decoding section 116a extracts, from the obtained decoded signal, information including an information data sequence, the number of bits per block $K_r$, the number of subcarriers per subframe $M_{sc}$, the number of symbols per subcarrier $N_{symb}$, the PUSCH offset, the data CH rank indication, and the control CH rank indication.

Decoding section 116a outputs the extracted information on $K_r$, $M_{sc}$, and $N_{symb}$ to coding rate setting section 121, and outputs information on the PUSCH offset, the data CH rank indication and the control CH rank indication to coding rate setting section 122a.

Coding rate setting section 122a sets control information coding rate $R'_{control}$, based on information on user data coding rate $R_{data}$, the PUSCH offset, and the combination of the data CH rank indication and the control CH rank indication. The internal configuration of coding rate setting section 122 and the method of setting control information coding rate $R'_{control}$ will be explained later. Coding rate setting section 122a outputs the set control information coding rate $R'_{control}$ to coding modulation section 124.

Figure 6:
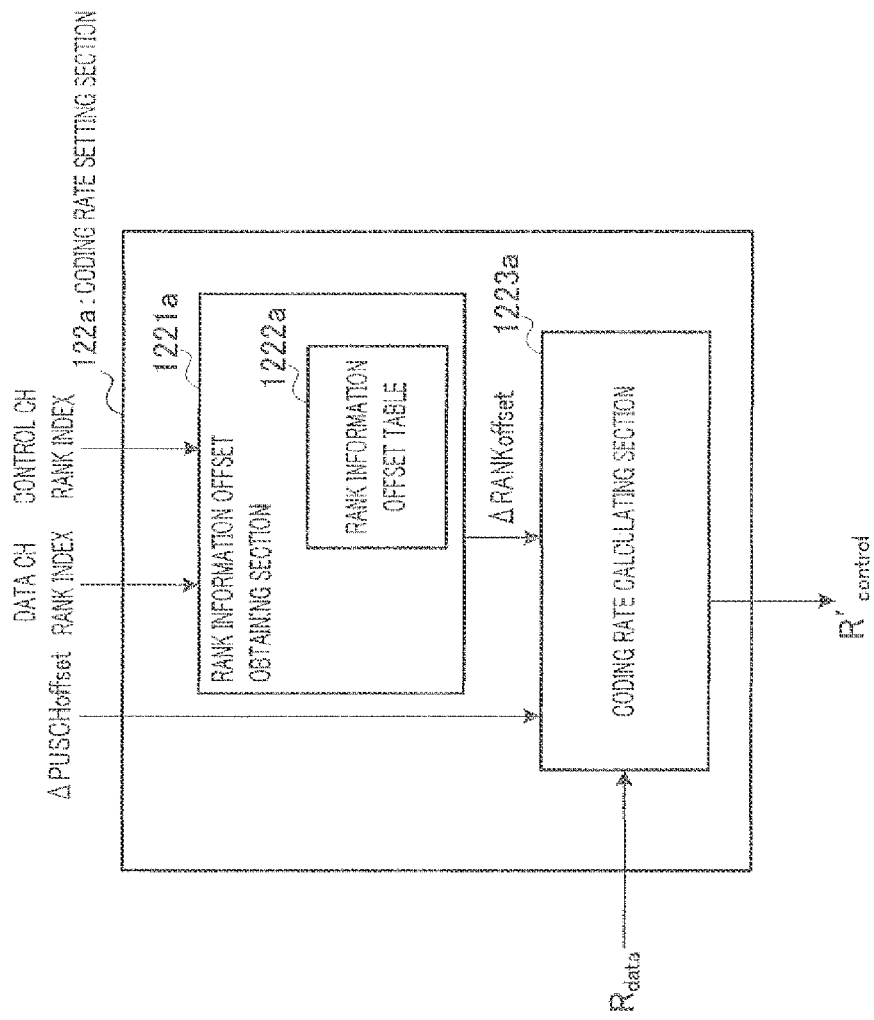
FIG. 6 is a block diagram showing a main configuration of a coding rate setting section according to Embodiment 2 of the present invention.

FIG. 6 is a block diagram showing an internal configuration of coding rate setting section 122a according to the present embodiment.

Rank information offset obtaining section 1221a stores rank information offset table 1222a inside, and obtains a rank offset ΔRANKoffset, corresponding to the combination of the data CH rank indication and the control CH rank indication, from rank information table 1222a. Rank information offset table 1222a will be explained later. Rank information offset obtaining section 1221a outputs the obtained rank offset ΔRANKoffset, to coding rate calculating section 1223a.

Coding rate calculating section 1223a sets control information coding rate $R'_{control}$ based on user data coding rate $R_{data}$, PUSCH offset ΔPUSCHoffset, and rank offset ΔRANKoffset, corresponding to the combination of the data CH rank indication and the control CH rank indication, based on equation 4.

FIG. 7 shows an example of rank information offset table 1222a stored inside the rank information offset obtaining section 1221a. FIG. 7 shows a case where the maximum rank indication is 2. According to the present embodiment, rank information offset table 1222a stores rank offsets ΔRANKoffset, corresponding to the combinations of a data CH rank indication and a control CH rank indication. The relationship between rank offsets ΔRANKoffset and the combinations of a data CH rank indication and a control CH rank indication will be described below.

As shown in case #1 in FIG. 7, when both the data CH rank indication and the control CH rank indication are 1, both the data CH and the control CH do not suffer interference between streams. Therefore, when obtaining the control information coding rate by correcting the user data coding rate, it is not necessary to consider the difference of the influence of interference between streams that the data CH suffers and the influence of interference between streams that the control CH suffers. Accordingly, as shown in case #1, when both the data CH rank indication and the control CH rank indication are 1, rank offset ΔRANKoffset is set at 0. When rank offset ΔRANKoffset is 0, the control information coding rate coincides with the coding rate that is set based on equation 3.

As shown in case #2 in FIG. 7, when the data CH rank indication is 1 and the control CH rank indication is 2, only control information suffers reception quality deterioration due to interference between streams. In this case, rank offset ΔRANKoffset is set at a (a<0). By setting ΔRANKoffset smaller than 0, it is possible to set the control information coding rate obtained based on equation 4 lower than the control information coding rate obtained based on equation 3. By this means, it is possible to enhance the capability of error correction of control in formation.

As shown in case #3 in FIG. 7, when the data CH rank indication is 2 and the control CH rank indication is 1, only user data suffers reception quality deterioration due to interference between streams. In this case, rank offset ΔRANKoffset is set at b (b>0). By setting ΔRANKoffset greater than 0, it is possible to set the control information coding rate obtained based on equation 4 higher than the control information coding rate obtained based on equation 3. By this means, it is possible to prevent control information from being encoded at an excessively low coding rate and suppress the decrease in the efficiency of control information transmission.

As shown in case #4 in FIG. 7, when the data CH rank indication and the control CH rank indication are 2, both the data CH and the control CH suffer interference between streams. In this case, the influence of interference between streams is considered to be approximately equal between user data and control information. Accordingly, as shown in case #4, when both the data CH rank indication and the control CH rank indication are 2, the value (c), corresponding to the slight difference of the influence of interference between streams that the data CH suffers and the influence of interference between streams that the control CH suffers in the communication status between a base station and a terminal, is set as rank offset ΔRANKoffset. When the influence of interference between streams that a data CH suffers and the influence of interference between streams that a control CH suffers are equal, rank offset ΔRANKoffset may be set at 0, as is the case with case #1.

FIG. 8 shows another example of rank information offset table 1222a stored inside the rank information offset obtaining section 1221a. FIG. 8 shows a case where the maximum rank indication is 4. The relationship between rank offset values ΔRANKoffset and the combinations of a data CH rank indication and a control CH rank indication will be described below. The explanation for cases #1 to 4 in FIG. 8 are the same as for cases #1 to 4 in FIG. 7, therefore the explanation will be omitted.

As shown in cases #5 and 9 in FIG. 8 and as is the case with case #2 in FIG. 7, when the control CH rank indication is greater than the data CH rank indication, control information reception quality deteriorates more severely than user data reception quality, due to the difference of the influence of interference between streams. In this case, rank offset ΔRANKoffset is set smaller than 0. By setting ΔRANKoffset smaller than 0, it is possible to set the control information coding rate obtained based on equation 4 lower than the control information coding rate obtained based on equation 3. By this means, it is possible to enhance the capability of error correction of control information. In this case, for example, when the greater absolute value of rank offset ΔRANKoffset is set as the data CH rank indication is smaller than the control CH rank indication, the control information coding rate becomes lower as the data CH rank indication is smaller than the control CH rank indication. Therefore, it is possible to prevent the control information reception quality from being deteriorated.

As shown in cases #6, 7, and 10-12 in FIG. 8 and as is the case with case #3 in FIG. 7, when the data CH rank indication is greater than the control CH rank indication, the user data reception quality deteriorates more severely than the control information reception quality due to the difference of the influence of interference between streams. In this case, rank offset ΔRANKoffset is set greater than 0. By setting ΔRANKoffset greater than 0, it is possible to set the control information coding rate obtained based on equation 4 higher than the control information coding rate obtained based on equation 3. By this means, it is possible to prevent control information from being encoded at an excessively low coding rate and suppress the decrease in the efficiency of control information transmission. In this case, for example, when the greater absolute value of rank offset ΔRANKoffset is set as the data CH rank indication is greater than the control CH rank indication, the control information coding rate becomes higher as the data CH rank indication is greater than the control CH rank indication. As a result of this, it is possible to prevent control information from being encoded at an excessively low coding rate and suppress the decrease in the efficiency of control information transmission.

As shown in cases #8 and 13 in FIG. 8 and as is the case with case #4 in FIG. 7, when the data CH rank indication and the control CH rank indication are equal, the influence of interference between streams that the data CH suffers and the influence of interference between streams that the control CH suffers are considered to be approximately equal. In this case, as shown in case #4, when both the data CH rank indication and the control CH rank indication are equal, the value (g and l), corresponding to the slight difference of the influence of interference between streams that a data CH suffers and the influence of interference between streams that a control CH suffers in the communication status between a base station and a terminal, is set as rank offset ΔRANKoffset. When the influence of interference between streams that the data CH and the influence of interference between streams that the control CH suffers are equal, rank offset ΔRANKoffset may be set at 0, as is the case with case #1.

FIG. 9 shows yet another example of rank information offset table 1222a stored inside rank information offset obtaining section 1221a. In FIG. 9, an identical rank offset ΔRANKoffset is defined for a plurality of combinations of a data CH rank indication and a control CH rank indication at rank information offset obtaining section 1221a. More specifically, an identical rank offset ΔRANKoffset is set for the combination where the data CH rank indication and the control CH rank indication are equal. The relationship between the combinations of a data CH rank indication and a control CHI rank indication and rank offset ΔRANKoffset will be described below. FIG. 9 shows a case where the maximum rank indication is 4, as is the case with FIG. 8.

As shown in case #1 in FIG. 9, when both the data CH rank indication and the control CH rank indication are 1, both the data CH and the control CH do not suffer interference between streams. Further, when both the data CH rank indication and the control CH rank indication are equal and are 2 or greater, the influence of interference between streams that the data CH suffers and the influence of interference between streams that the control CH suffers are considered to be approximately equal.

In this case, when the data CH rank indication and the control CH rank indication are equal, rank offset ΔRANKoffset is set at 0 assuming that the influence of interference between streams is equal between the data CH and the control CH.

As shown in cases #2-6 in FIG. 9, when the data CH rank indication is greater than the control CH rank indication, the user data reception quality deteriorates more severely than the control information reception quality due to the difference of the influence of interference between streams. In this case, rank offset ΔRANKoffset is set greater than 0. By setting ΔRANKoffset greater than 0, it is possible to set the control information coding rate obtained based on equation 4 higher than the control information coding rate obtained based on equation 3. By this means, it is possible to prevent control information from being encoded at an excessively low coding rate and suppress the decrease in the efficiency of control information transmission.

In this case, rank offset ΔRANKoffset of a greater value is set when the ratio of the data CH rank indication to the control CH rank indication (the data CH rank indication/the control CH rank indication) is greater. For example, in FIG. 9, when the relationship p>n>m>o>q holds, the control information coding rate becomes higher as the data CH rank indication is greater than the control CH rank indication. Accordingly, it is possible to prevent control information from being encoded at an excessively low coding rate and suppress the decrease in the efficiency of control information transmission.

As described above, according to the present embodiment, coding rate setting section 122a corrects the value of the user data coding rate to be adaptively set according to a channel quality indicator of a user, based on the type of control information to be time-multiplexed with user data and the combination of the data CH rank indication and the control CH rank indication, and sets the corrected value of the coding rate as the control information coding rate. That is, coding rate setting section 122a sets the user data coding rate to be adaptively set according to a channel quality indicator of a user as a reference value, corrects the reference value based on the type of control information to be time-multiplexed with user data and the combination of the data CH rank indication and the control CH rank indication, and sets the corrected reference value as the control information coding rate. For example, control information coding rate, $R'_{control}$, to be time-multiplexed with user data is set based on user data coding rate $R_{data}$, PUSCH offset ΔPUSCHoffset per control information, and rank offset, ΔRANKoffset, corresponding to the combination of the data CH rank indication and the control CH rank indication, based on equation 4.

Further, by correcting the control information coding rate to be higher when the data CH rank indication is greater than the control CH rank indication, it is possible to correct the user data coding rate based on the difference of the influence of interference between streams that a data CH suffers and the influence of interference between streams that a control CH suffers, and set the control information coding rate. As a result of this, even when the user data coding rate is low, it is possible to prevent the control information coding rate from being set excessively low and suppress the decrease in the efficiency of control information transmission.

Although cases have been described above as examples where the control information coding rate is set at a terminal, the present invention is by no means limited to this, and it is equally possible that a base station sets the control information coding rate and reports the set control information coding rate to a terminal, so that the terminal can obtain the reported control information coding rate.

Further, it is also possible that a base station sets rank offset ΔRANKoffset instead of the control information coding rate, and report the set rank offset ΔRANKoffset to a terminal so that the terminal can obtain the control information coding rate using the reported rank offset ΔRANKoffset.

Further, it is also possible that a base station reports a rank information offset table to a terminal via a higher layer.

Further, the present invention is not limited to a data CH and a control CH, and is also applicable to other two channels having the different reception qualities required for the present invention.

Although cases have been described with the above embodiment as examples where the present invention is configured by hardware, the present invention can also be realized by software in combination with hardware.

Each function block employed in the description of each of the aforementioned embodiments may typically be implemented as an LSI constituted by an integrated circuit. These may be individual chips or partially or totally contained on a single chip. LSI is adopted here but this may also be referred to as "IC", "system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of a programmable field programmable gate array (FPGA) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is possible, for example.

The disclosure of Japanese Patent Application No. 2008-307658, filed on Dec. 2, 2008, including the specification, drawings and abstract, is incorporated herein by reference in its entirety.

INDUSTRIAL APPLICABILITY

The present invention is useful as a coding rate setting method and a radio communication apparatus used for the radio communication system using adaptive modulation and MIMO technology.

REFERENCE SIGNS LIST

100, 100a Terminal
110 Receiving section
111 Radio receiving section
112 CP removing section
113 FFT section
114 Propagation path estimation section
115 Demodulation section
116, 116a Decoding section
120 Transmission section
121, 122, 122a Coding rate setting section
123, 124 Coding modulation section
125 Channel multiplexing section
126 DFT-s-OFDM section
127 CP adding section
128 Radio transmission section
1221, 1221a Rank information offset obtaining section
1222, 1222a Rank information offset table
1223, 1223a Coding rate calculating section

The invention claimed is:

1. An integrated circuit, which, in operation, controls a process of transmitting control information by a communication apparatus, the process comprising:
encoding control information in accordance with a coding rate, the coding rate being set based on an offset value corresponding to one of a first offset and a second offset that are signaled by a higher layer, the first offset being different from the second offset, and the second offset being not used in a case when a rank indicator is 1; and
transmitting the encoded control information.

2. The integrated circuit according to claim 1, comprising:
circuitry which, in operation, controls the process;
at least one input coupled to the circuitry, wherein the at least one input, in operation, inputs data; and
at least one output coupled to the circuitry, wherein the at least one output, in operation, outputs data.

3. The integrated circuit according to claim 1 wherein the coding rate is set depending on a type of the control information.

4. The integrated circuit according to claim 3, wherein the type of the control information is one of a hybrid automatic repeat-request acknowledgement (HARQ-ACK), the rank indicator, and a channel quality indicator (CQI).

5. The integrated circuit according to claim 1 wherein the first offset is used in a case when the rank indicator is 1.

6. The integrated circuit according to claim 1 wherein the second offset is used in a case only when the rank indicator is greater than 1.

7. The integrated circuit according to claim 1 wherein the first offset is used in a case when the rank indicator is 1, and the second offset is used in a case only when the rank indicator is greater than 1.

8. The integrated circuit according to claim 2, wherein the at least one output and the at least one input, in operation, are coupled to an antenna.

9. An integrated circuit, which, in operation, controls a process of transmitting control information by a communication apparatus, the process comprising:
    encoding control information in accordance with a coding rate, the coding rate being set based on an offset value corresponding to one of a first offset and a second offset that are signaled by a higher layer, the first offset being different from the second offset, wherein the one of the first offset and the second offset is selected based on a rank indicator; and
    transmitting the encoded control information.

10. The integrated circuit according to claim 9, comprising:
    circuitry which, in operation, controls the process;
    at least one input coupled to the circuitry, wherein the at least one input, in operation, inputs data; and
    at least one output coupled to the circuitry, wherein the at least one output, in operation, outputs data.

11. The integrated circuit according to claim 9 wherein the coding rate is set depending on a type of the control information.

12. The integrated circuit according to claim 11, wherein the type of the control information is one of a hybrid automatic repeat-request acknowledgement (HARQ-ACK), the rank indicator, and a channel quality indicator (CQI).

13. The integrated circuit according to claim 9 wherein the first offset is used in a case when the rank indicator is 1.

14. The integrated circuit according to claim 9 wherein the second offset is used in a case only when the rank indicator is greater than 1.

15. The integrated circuit according to claim 9 wherein the first offset is used in a case when the rank indicator is 1, and the second offset is used in a case only when the rank indicator is greater than 1.

16. The integrated circuit according to claim 10, wherein the at least one output and the at least one input, in operation, are coupled to an antenna.

17. A non-transitory computer-readable medium having contents which configure a communication apparatus to perform a method, the method comprising:
    encoding control information in accordance with a coding rate, the coding rate being set based on an offset value corresponding to one of a first offset and a second offset that are signaled by a higher layer, the first offset being different from the second offset, and the second offset being not used in a case when a rank indicator is 1; and
    controlling transmission of the encoded control information.

18. The non-transitory computer-readable medium according to claim 17 wherein the method comprises:
    receiving data at an input.

19. The non-transitory computer-readable medium according to claim 17 wherein the coding rate is set depending on a type of the control information.

20. The non-transitory computer-readable medium according to claim 19, wherein the type of the control information is one of a hybrid automatic repeat-request acknowledgement (HARQ-ACK), the rank indicator, and a channel quality indicator (CQI).

21. The non-transitory computer-readable medium according to claim 17 wherein the first offset is used in a case when the rank indicator is 1.

22. The non-transitory computer-readable medium according to claim 17 wherein the second offset is used in a case only when the rank indicator is greater than 1.

23. The non-transitory computer-readable medium according to claim 17 wherein the first offset is used in a case when the rank indicator is 1, and the second offset is used in a case only when the rank indicator is greater than 1.

24. The non-transitory computer-readable medium according to claim 17 wherein the method comprises transmitting the encoded control information on an antenna.

25. A non-transitory computer-readable medium having contents which configure a communication apparatus to perform a method, the method comprising:
    encoding control information in accordance with a coding rate, the coding rate being set based on an offset value corresponding to one of a first offset and a second offset that are signaled by a higher layer, the first offset being different from the second offset, wherein the one of the first offset and the second offset is selected based on a rank indicator; and
    controlling transmission of the encoded control information.

26. The non-transitory computer-readable medium according to claim 25 wherein the method comprises:
    receiving data at an input.

27. The non-transitory computer-readable medium according to claim 25 wherein the coding rate is set depending on a type of the control information.

28. The non-transitory computer-readable medium according to claim 27, wherein the type of the control information is one of a hybrid automatic repeat-request acknowledgement (HARQ-ACK), the rank indicator, and a channel quality indicator (CQI).

29. The non-transitory computer-readable medium according to claim 25 wherein the first offset is used in a case when the rank indicator is 1.

30. The non-transitory computer-readable medium according to claim 25 wherein the second offset is used in a case only when the rank indicator is greater than 1.

31. The non-transitory computer-readable medium according to claim 25 wherein the first offset is used in a case when the rank indicator is 1, and the second offset is used in a case only when the rank indicator is greater than 1.

32. The non-transitory computer-readable medium according to claim 26, wherein the method comprises transmitting the encoded control information on an antenna.

* * * * *